United States Patent [19]

Sperry et al.

[11] Patent Number: 4,898,327
[45] Date of Patent: Feb. 6, 1990

[54] INJECTION SYSTEM FOR FOAMABLE COMPOSITIONS

[75] Inventors: Lawrence B. Sperry, New York, N.Y.; Henry J. Ruddy, Newton, Conn.

[73] Assignee: Sealed Air Corporation, Saddle Brook, N.J.

[21] Appl. No.: 235,064

[22] Filed: Aug. 22, 1988

[51] Int. Cl.⁴ .................................. B05B 15/02
[52] U.S. Cl. ............................ 239/1; 239/112; 239/117; 141/90; 141/91; 134/166 R; 222/148; 264/39; 264/169; 137/240
[58] Field of Search ............ 239/1, 106, 113, 112, 239/117, 93, 99, 433; 141/90, 91; 134/166 R, 169 R; 184/55.1, 55.2, 58; 222/148, 149, 152, 190; 264/39, 169; 425/228, 227, 543; 137/240

[56] References Cited

U.S. PATENT DOCUMENTS

| | | | |
|---|---|---|---|
| 3,026,894 | 3/1962 | Brooks | 137/240 |
| 3,167,034 | 1/1965 | Oakes et al. | 137/240 |
| 3,690,556 | 9/1972 | McCain | 239/117 |
| 3,692,442 | 9/1972 | Gerbert | 425/225 |
| 3,790,030 | 2/1974 | Ives | 222/148 |
| 4,062,525 | 12/1977 | Harmon et al. | 425/225 |
| 4,140,238 | 2/1979 | Dawson | 425/225 |
| 4,350,187 | 9/1982 | Trusselle et al. | 141/90 |
| 4,377,256 | 3/1983 | Commette et al. | 239/117 |
| 4,386,899 | 6/1983 | Cook | 425/225 |
| 4,443,177 | 4/1984 | Modur et al. | 425/225 |
| 4,568,003 | 2/1986 | Sperry et al. | 239/433 |
| 4,674,268 | 6/1987 | Gavronsky et al. | 53/469 |
| 4,800,708 | 1/1989 | Sperry | 53/449 |

FOREIGN PATENT DOCUMENTS

| | | | |
|---|---|---|---|
| 2575405 | 6/1986 | France | 425/225 |
| 0093336 | 5/1984 | Japan | 425/225 |
| 1151472 | 4/1985 | U.S.S.R. | 425/225 |

*Primary Examiner*—Robert J. Oberleitner
*Assistant Examiner*—Karen B. Merritt
*Attorney, Agent, or Firm*—Bell, Selzter, Park & Gibson

[57] ABSTRACT

The invention comprises a self-cleaning injection system for injecting foamable compositions into packaging applications. The system comprises an injection nozzle having an opening in one end from which mixed foam precursors which form foamable compositions may exit. The one end comprises a tip assembly which is porous to gases and to certain liquids, but which is impermeable to other materials such as the foamable compositions which may otherwise exit the housing only through said opening. A pump assembly pumps cleaning solvent from a solvent container to the injection nozzle while maintaining a constant delivery of air or a mixture of air and solvent to the injection nozzle. The pump assembly comprises a solvent container and an air compressor for sending air to the solvent container and for sending a mixture of solvent and air from the solvent container to said injection nozzle. The pump assembly is in communication with the injection nozzle so that a mixture of air and solvent may be sent from the solvent container to the pump assembly, to the injection nozzle and out of the porous tip assembly, to thereby help to clean accumulated foamable composition from the injection nozzle.

17 Claims, 3 Drawing Sheets

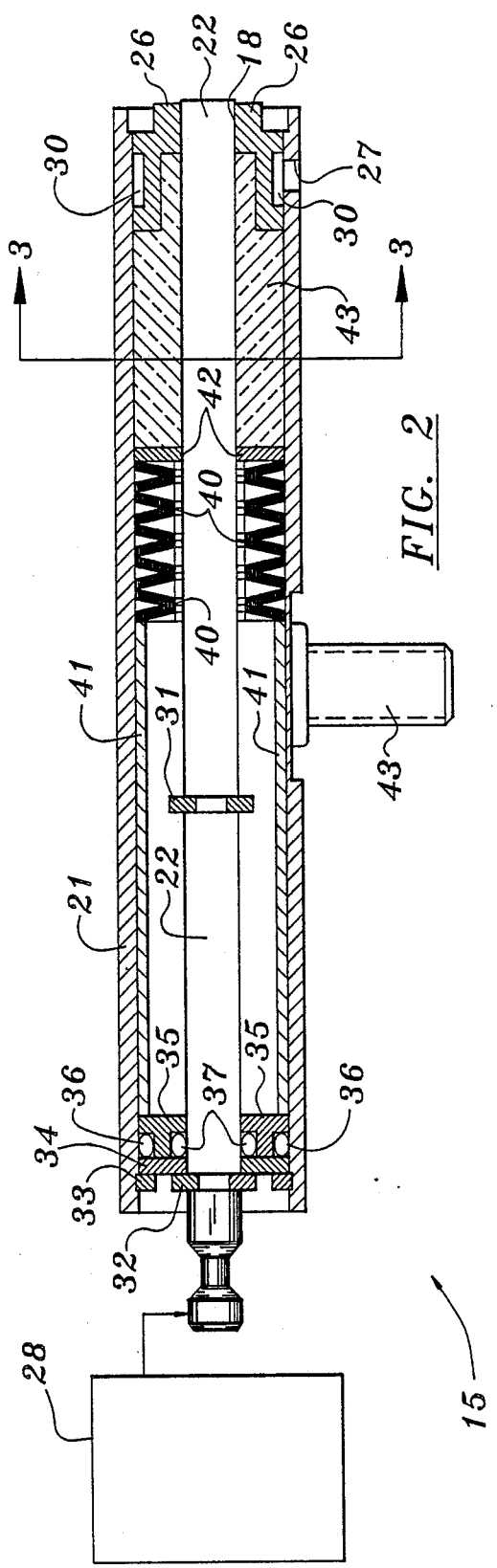
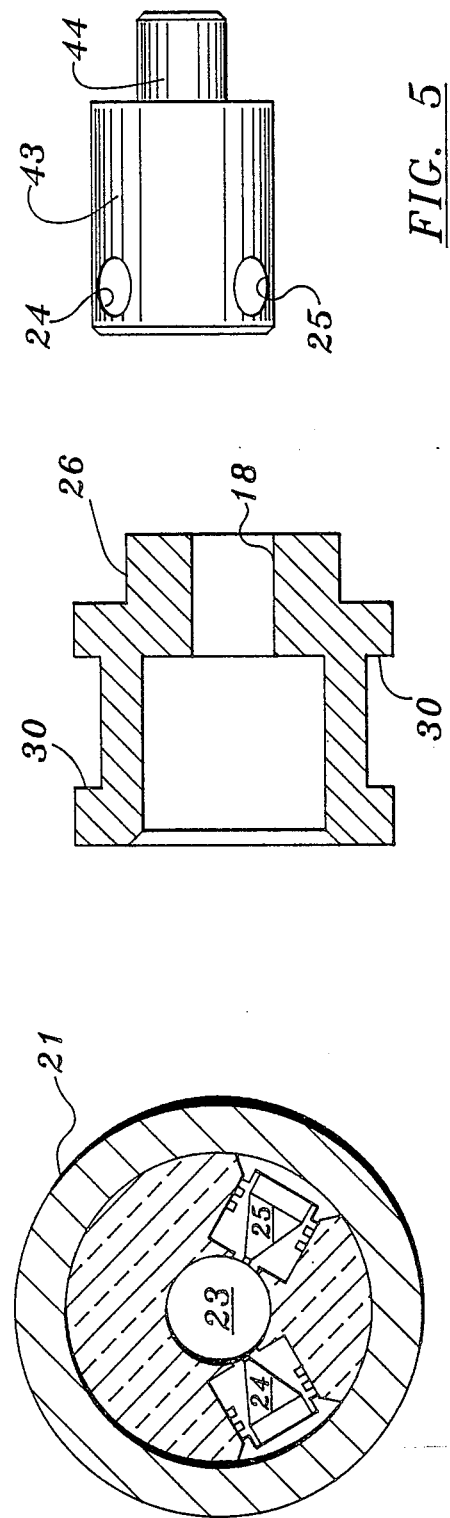

INJECTION SYSTEM FOR FOAMABLE COMPOSITIONS

FIELD OF THE INVENTION

The present invention relates to injection systems for foamable compositions and in particular relates to an improved, self-cleaning injection nozzle within which the precursors to the foamable compositions can be mixed and then injected in packaging applications.

BACKGROUND OF THE INVENTION

The present invention relates to the use of foamable compositions for packaging purposes. In a number of packaging applications, fragile articles or those which otherwise need to be protected from movement or breakage, particularly items with irregular shapes and sizes, have been packed in protective foamed polymer packaging materials, such as injection molded styrofoam, styrofoam chips, or other similar materials.

One particular technique for packaging articles in foam comprises of methods in which the foam is generated in place during the process of packaging the articles. For example, when certain chemicals are mixed together they form polymeric products while at the same time they generate gases such as carbon dioxide and water vapor. If those chemicals are selected so that they harden following the generation of the carbon dioxide and water vapor, they can be used to form hardened polymer foams in which the mechanical foaming action is caused by the gaseous carbon dioxide and water vapor leaving the mixture.

One technique for foam in place packaging is to place the object to be packaged in a container, cover it with a polymer film or other material which will protect it from liquids, inject a certain amount of a foamable composition into the remainder of the container, and then close the container. As the composition foams, it fills the remainder of the container, forming a custom shaped foam cushion surrounding the article.

More recently, machines have been developed for automatically providing the foam cushioning. For example, in U.S. Pat. No. 4,674,268 to Gavronsky et al., which is assigned to the assignee of the present invention, an apparatus is disclosed which forms plastic bags from plastic tubing and inserts a predetermined amount of a foamable composition into the bags while leaving ventilation openings in the bag. As the foamable composition foams and generates gases, they escape through the ventilation openings while the bag fills with foam. In a particular application, the bag can be placed into a container for packaging purposes immediately after the foamable composition has been added. When the container is closed, the foam within the bag expands to occupy a large proportion, and often all, of the remaining container space surrounding the article or articles in the container. The plastic bag protects the articles from the foam and the result is an efficient customized packaging system. The contents of U.S. Pat. No. 4,674,268 are hereby incorporated by reference.

A similar apparatus which forms such bags from plastic sheet material is described in U.S. Pat. No. 121,223 filed Nov. 16, 1987 on behalf of Charles R. Sperry and Ser. No. 07/236,013, filed Aug. 22, 1988, on behalf of Pinarer et al, and both also assigned to the assignee of the present invention. The contents of both of these applications are hereby incorporated by reference.

One problem with the foamable compositions, however, is that some of the more useful polymers which they form tend to have somewhat adhesive properties. As a result, the foamable composition, which is often dispensed as a somewhat viscous liquid, tends to stick to objects that it strikes and harden into foam. One location where this causes a particular problem is the injection nozzle or cartridge from which the foam is ejected. As those familiar with such foamable compositions are aware, the compositions are often formed from two precursors. These precursors must be withheld from mixing with one another until just prior to injection so that a typical injection cartridge or nozzle contains the means for allowing the two foam precursors to enter the cartridge, mix with one another, and then exit therefrom as the foamable composition. Accordingly, as an injection nozzle operates over and over again, particularly in automated or successive fashion, foamable composition tends to build up around the injection opening, harden into foam, and block the proper exiting of further foamable composition. As a result, the injection nozzles either have to be manually cleaned, or mechanically wiped as in the Gavronsky description. The mechanical articulation required to mechanically wipe such nozzles tends to be rather complicated, and adds associated expense and potential for mechanical problems.

Where automated machines for repetitively producing plastic bags containing foamable composition are used, however, it is disadvantageous to have to continue to interrupt the packaging process to clean the injection nozzle, or to correct the operation of a complicated mechanical wiping system. Nevertheless, no satisfactory method has been developed for repeatedly and automatically cleaning the foamable composition from such injection nozzles and keeping them clean as foam is repetitively injected through them, while avoiding the mechanical complexity of an automated wiping system.

Therefore, it is an object of the present invention to provide a self-cleaning injection nozzle which includes means for automatically cleaning foamable composition from the nozzle, particularly the opening portion, on a repetitive basis, using a minimum of moving parts.

SUMMARY OF THE INVENTION

Accordingly, the invention comprises a self-cleaning injection nozzle and pumping system. The nozzle includes a valving rod which moves longitudinally within a housing and opens and closes the tip of the cartridge from which the foamable composition exits. A porous tip surrounds the valving rod at the injection end of the housing, and in order to clear foamed chemical build up from the nozzle, a solvent is injected with compressed air through the porous tip and past the opening. The agitation of the solvent and air as they are mixed and passed through the porous tip produces a cleaning action which thoroughly washes foam from the tip of the nozzle. The invention further comprises a novel pump assembly used in conjunction with the self-cleaning cartridge. The pump comprises a bellows operated by the flow of compressed air. Control of the compressed air raises or lowers the bellows which in turn move a piston and connecting rod that in turn move another piston which draws solvent into the pump and upwardly to a pump head assembly where compressed air and solvent are mixed and forwarded on to the injection nozzle.

The above and other objects and details of the invention will be further understood when taken in conjunction with the following detailed description and with the drawings in which:

DESCRIPTION OF THE DRAWINGS

FIG. 2 is a cross sectional view of the self-cleaning nozzle of the present invention;

FIG. 3 is a cross sectional view taken along 10 lines 3—3 of FIG. 2;

FIG. 4 is an isolated longitudinal cross sectional view of the porous tip of the present invention;

FIG. 5 is a transverse cross-sectional view of the portion of the injection nozzle through which the foam precursors enter;

DETAILED DESCRIPTION

Figure 1:
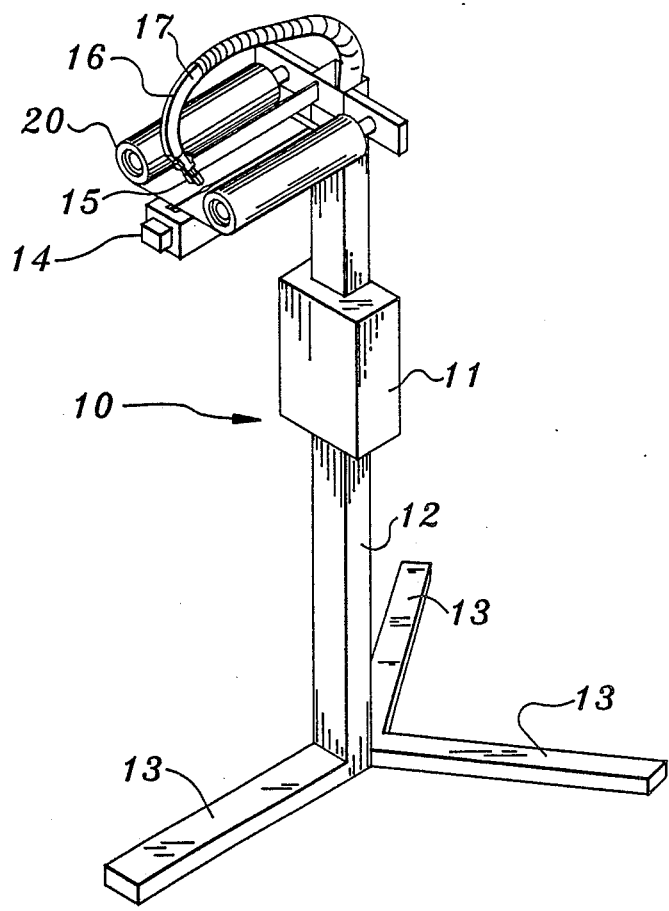
FIG. 1 is a perspective, environmental view of an automatic packaging machine which incorporates the self-cleaning nozzle and pump system of the present invention.

FIG. 1 illustrates a packaging machine of the type described in the co-pending Sperry and Pinarer applications discussed earlier and is broadly designated at 10. The pumping system which will be described later herein may be conveniently positioned in a housing 11 on an upright member 12 which in turn is supported on three substantially identical legs 13 which form a tripod supporting the upright member 12. As discussed in the aforementioned co-pending applications, such a machine typically includes an apparatus 14 for forming plastic bags from rolled stock or plastic tubing. The injection nozzle of the present invention is designated at 15 and is positioned in a manner which is more fully described in the co-pending Pinarer application. A pair of hoses 16 and 17 carry the two respective foam precursors to the injection nozzle 15 so that foamable composition may be injected into a bag being formed from the plastic film material carried on the respective rolls 20.

The cross sectional view of FIG. 2 shows a number of details of the structure and operation of the self-cleaning injection nozzle 15 of the present invention. The nozzle 15 comprises a generally cylindrical housing 21 which receives the foam precursors through the hoses 16 and 17 from a conventional supply mechanism (not shown). A cylindrical valving rod 22 moves longitudinally within the housing 21. In the orientation of FIG. 2, the opening 18 in one end of the housing 21 the nozzle 15 from which the foaming chemicals exit, and upon which foam would otherwise tend to build up, is at the right hand side of the figure. When valving rod 22 is moved far enough to the left, it leaves behind a vacant mixing chamber 23 best illustrated in FIG. 3 into which foam precursors are injected through respective entry ports 24 and 25. When the valving rod 22 is moved entirely to the right, the orientation shown in FIG. 2, it prevents the foam precursors from entering through the ports 24 and 25 and shuts off the flow of foam out of the opening 18 in the one end of the housing 21.

The present invention further comprises the insertion of a porous tip assembly 26 which surrounds the valving rod 22 at the injection end of the nozzle 15. The tip assembly is selected from materials which are porous to gases and certain liquids, but impermeable to other materials such as the foamable compositions typically used in such packaging applications. In the present preferred embodiments, the porous tip is formed of a sintered metal. In order to prevent hardened foam from building up on the cartridge, solvent is delivered through a solvent inlet 27 into an annular mixing chamber 30 which is concentric with the nozzle housing 21 and the valving rod 22. A stream of compressed air carries the solvent into the mixing chamber 30 and forces a mixture of air and solvent through the sintered metal tip assembly 26. The agitation of the solvent and air as they are mixed and passed through the sintered metal tip produces a cleaning action which rinses foam from the tip of the nozzle and keeps the nozzle clean and in optimum operating condition.

FIG. 2 illustrates a number of other details of the injection nozzle 15. Respective retainers 31 and 32 define the limits of the stroke of the valving rod 22. Another retainer 33 maintains a number of other elements in position including the nozzle washer 34, the O-ring housing 35, and the respective O-rings 36 and 37. A series of springs 40 are positioned between an inner nozzle tube 41 and an annular scraper 42. The scraper 42 is fixed to the valving rod 22 so that the springs 40 which exert force between the inner tube 41 and the scraper 42 always tend to urge the valving rod toward the closed position.

For the sake of clarity and focusing on the invention, the means for moving the valving rod into and out of the opening 18 has only been shown schematically as 28 in FIG. 2, but it will be understood that any appropriate control mechanism such as electromagnetic or hydraulic devices may be conveniently employed. Additionally, the entire nozzle 15 may be mounted using a welded stud 43 as may be necessary or desired.

As stated earlier herein, FIG. 3 is a cross sectional view which illustrates the entry ports 24 and 25 for the foam precursors, and the mixing chamber 23 in more detail. FIG. 3 and FIG. 5 also illustrate the foam mixing housing 43 which helps define the foam mixing chamber 23 when the valving rod 22 is in the open position. As illustrated in FIG. 5, the foam mixing housing 43 has two generally cylindrical portions of different respective sizes, the larger portion of which carries the foam entry ports 24 and 25 and the small portion 44 of which concentrically surrounds the valving rod 22 and is in turn concentrically surrounded by portions of the porous tip assembly 26.

Figure 6:
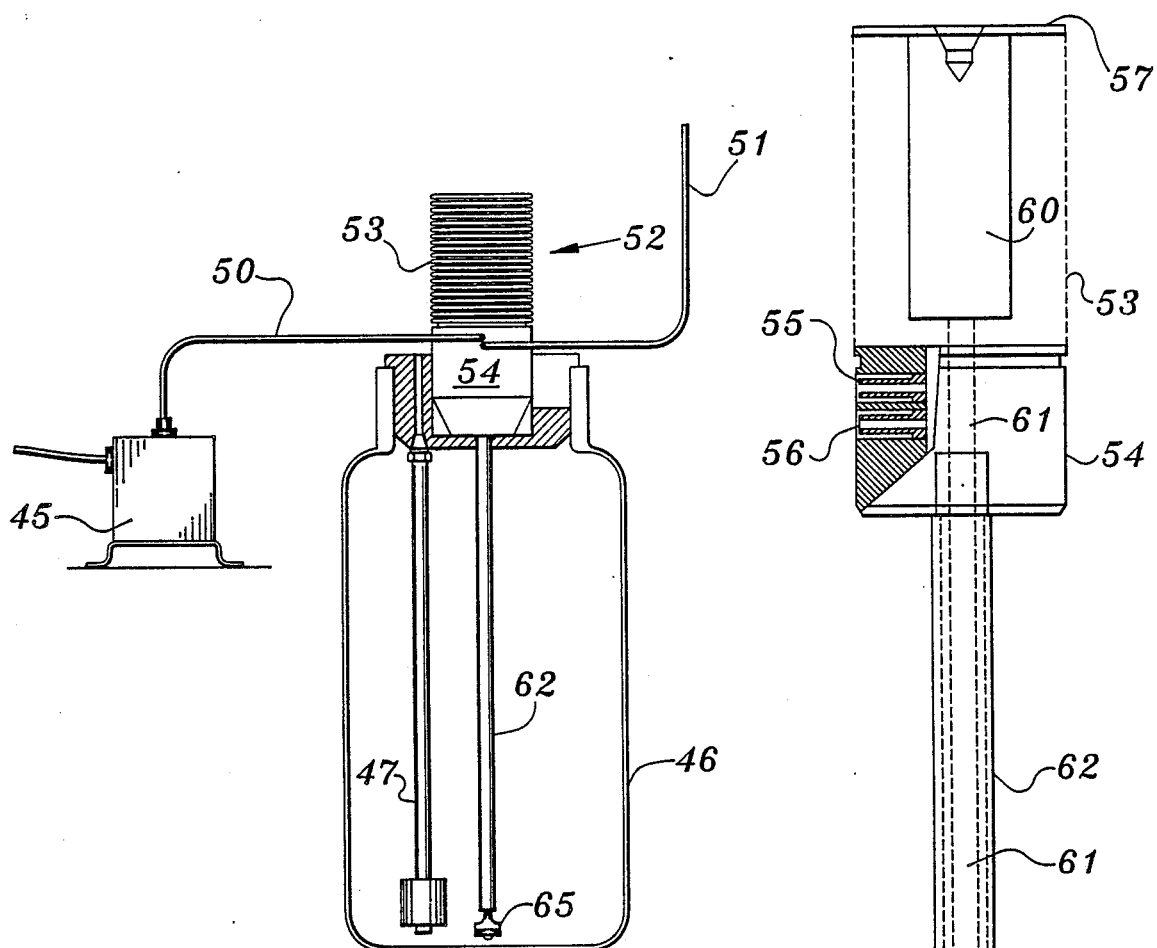
FIG. 6 is an overall schematic view of the pumping system of the present invention.
Figure 7:
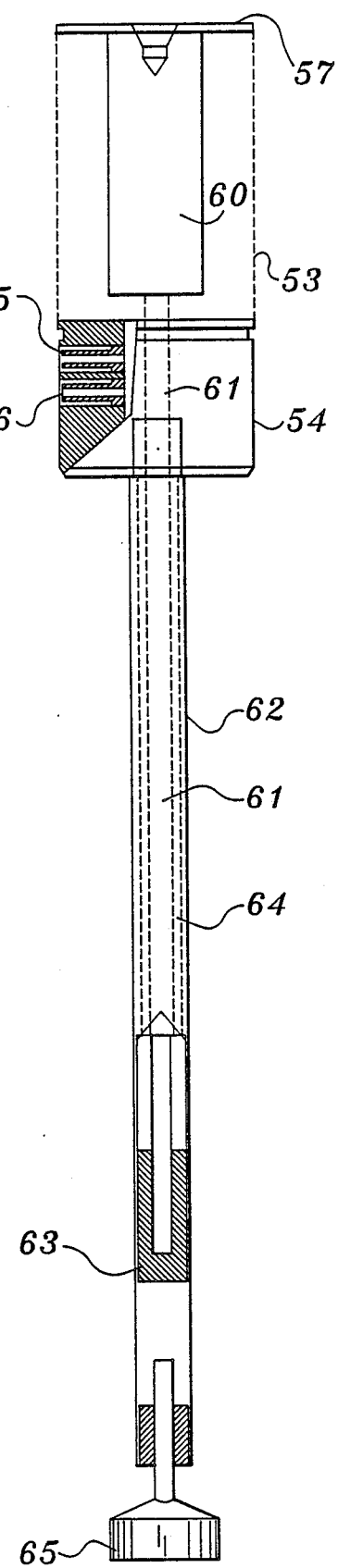
FIG. 7 is a cross sectional detailed view of a portion of the pumping of the present invention.

The novel pump assembly of the present invention provides the means for delivering a solvent in which the foamable composition is soluble, and is best illustrated in FIGS. 6 and 7. FIG. 6 is an overall schematic view which shows an air compressor 45, a solvent container 46, a solvent level measuring switch mechanism 47, respective portions of tubing 50 and 51 for carrying first air and then mixtures of air and solvent, and the pumping mechanism broadly designated at 52. The pumping mechanism includes a bellows 53 shown in detail in FIG. 6 and represented by the dashed lines in FIG. 7. The bellows is in air flow communication with the compressor 45 through the tubing 50, and is raised and lowered in response to an increase in the flow of air from the compressor 45.

A pump head assembly 54 is in air flow communication with, and positioned immediately below, the bellows 53. The pump head assembly 54 includes an inlet connector 55 and an outlet connector 56, and is at least partially fillable with solvent from the container 46. Because the pumping mechanism is operated by the bellows 53, a steady stream of air through the pump head assembly 54 will not affect the bellows 53, but instead the bellows 53 will only be raised in a pumping fashion when the stream of air is increased somewhat. When that occurs, an upper portion 57 will be raised and will in turn raise the upper piston 60 which is operatively associated with the bellows 53 for being raised and lowered concurrently therewith. A connecting rod 61 is operatively associated with the upper piston 60 and in the illustrated embodiment extends downwardly through the connecting tube 62 and connects with a lower piston 63. As the lower piston 63 is raised and lowered, it draws solvent upwardly into and through a connecting tube 64 in the pump housing 62 and to the pump head assembly 54. A check valve 65 allows solvent from the container 46 to enter the pump housing 62 and connecting tube 64, but prevents compressed air or any other materials from exiting the pump into the housing 46.

Because of the relationship of the inlet and outlet connectors 55 and 56 respectively in which the compressed air inlet connector 55 is positioned above the air and solvent outlet connector 56, the level of solvent in the pump head assembly 54 will always be maintained no higher than a point just above the outlet connector 56, thus preventing any back flow of solvent from the pump head to the compressor.

In operation, a steady stream of compressed air is circulated from the compressor 45 through the tubing 50 into the inlet connector 55, and out of outlet connector 56 either with or without solvent. If pumping of solvent is desired, an increased amount of compressed air is forwarded from the compressor 45 and temporarily inflates and lifts the bellows 53, which in turn pumps solvent into the pump head assembly 54 within which it is mixed with the compressed air and exited along with the flowing compressed air out of outlet connector 56.

As described earlier, the mixture of compressed air and solvent travels to the solvent inlet 27 in the housing 21 of the nozzle 15 and then is forced through the porous tip assembly 26 in which it is further agitated so that an agitated mixture of air and solvent exits the porous tip assembly adjacent the opening 18 in the end of the housing 21, thereby cleaning it. It will thus be seen that the operation of the pump is unique in that a constant flow of compressed air is always travelling from the compressor 45 to the injection nozzle 15 so as to continue to carry a mixture of solvent and air downstream to the injection nozzle 15 even when pumping of solvent into the pump head assembly 54 is not taking place. If the pump were arranged so that any flow of compressed air always pumped solvent, the flow of compressed air would have to be stopped and started repeatedly and could not continuously carry solvent or air downstream toward the nozzle 15. In the present invention, solvent and air or air alone can travel from the pump to the injection nozzle regardless of whether pumping is taking place.

In the preferred embodiment of the invention, the entire pump assembly of FIG. 6 is carried on an apparatus such as is illustrated in FIG. 1 and carried in the housing 11 on the upright member 12. Using an appropriate controller, the pump can be operated so as to send a portion of compressed air and solvent to the injection nozzle and through the porous tip assembly 26 every time foam is injected out of the nozzle 15. In an apparatus such as illustrated in FIG. 1, foam is injected into each bag being formed, following which solvent and air pass through the porous tip and clean it, following which formation of the bag is completed, and formation of the next bag initiated.

The invention thus provides a novel method of cleaning, and keeping clean, the injection nozzle of a foam injection system and does so without the need for complicated mechanical operations.

The description set forth herein represents a preferred and exemplary embodiment, and is descriptive of the invention rather than limiting of it, the proper scope of the invention being given in the following in claims.

That which is claimed is:

1. An apparatus for cleaning foamable compositions from the outer exit portions of the injection nozzle of an injection system for foamable compositions, the apparatus comprising:

a tip assembly adjacent the outer portion of an injection nozzle from which foamable compositions may exit said injection nozzle, and wherein said tip assembly is porous to gases and certain liquids, but impermeable to other materials such as the foaming compositions which otherwise exit said injection nozzle; and means for delivering a solvent in which foamable compositions are soluble into, then through, and then out of said porous tip assembly and adjacent said outer exit portions of said injection nozzle so that solvent which passes out of said tip assembly thereby cleans foamable compositions from said outer exit portions of said injection nozzle.

2. A self-cleaning injection system for injecting foamable compositions into packaging applications, the system comprising:

an injection nozzle assembly comprising,
      a housing for receiving foam precursors and allowing then to mix therein and having an opening in one end thereof from which mixed foam precursors which form foamable compositions may exit, said one end comprising a tip assembly which is adjacent the outer exit portion of said housing and which is porous to gases and to certain liquids, but which is impermeable to other materials such as the foamable compositions which may otherwise exit the housing only through said opening,
      a valving rod longitudinally disposed within said housing and longitudinally movable therein and having a cross-sectional profile substantially equivalent to the cross-sectional profile of said opening in said porous tip assembly in said housing so that the movement of said valving rod into and out of said opening respectively closes and opens said opening to the exiting of foamed precursors therethrough,
      means for moving said valving rod into and out of said opening to thereby respectively close and open said opening; and
   means for delivering a solvent for which foamable compositions are soluble to, through and out of said porous tip assembly and out of said housing adjacent said outer exit portions of said housing so that the delivery of solvent to and out of said tip assembly removes foamable compositions from said outer exit portions of said one end of said housing and keeps said injection nozzle clean and in optimum operating condition.

3. An injection system according to claim 2 wherein said porous tip assembly is formed of a sintered metal.

4. An injection system according to claim 2 wherein said housing has a generally cylindrical shape.

5. An injection system according to claim 2 wherein said valving rod comprises a cylinder.

6. An injection system according to claim 5 wherein said opening in said one end of said housing is circular and has a diameter substantially equivalent to the diameter of said valving rod.

7. An injection system according to claim 2 wherein said means for delivering a solvent comprises an air-compressor driven pumping system which carries a mixture of air and solvent to said porous tip assembly.

8. A pump assembly for pumping cleaning solvent from a solvent container while maintaining a constant delivery of air or a mixture of air and solvent to a self-cleaning injection nozzle having a porous tip through which cleaning solvent may pass when said injection nozzle is used to deliver foamable compositions into packaging applications, the pump assembly comprising:

a solvent container;

an air compressor for sending air to said solvent container and for sending a mixture of solvent and air from said solvent container to an injection nozzle;

a bellows on said solvent container and in air flow communication with said air compressor for being raised and lowered in response to an increase in the flow of air from said air compressor;

a pump head in air flow communication with said bellows and having an inlet connector for receiving compressed air and an outlet connector for dispensing compressed air, solvent, or a mixture of air and solvent, said pump head being at least partially fillable with solvent from said container;

a connecting tube extending downwardly from said pump head to lower portions of said solvent container and through which solvent from said container may pass to said pump head;

an upper piston operatively associated with said bellows for being raised and lowered concurrently therewith;

a connecting rod operatively responsive to the raising and lowering movement of said upper piston;

a lower piston positioned at the lower end of said connecting tube for drawing solvent from said solvent container into said connecting tube and responsive to the movement of said connecting rod; and means for placing said outlet connector of said pump head in communication with a self-cleaning injection nozzle whereby an increase in the flow of air into said bellows lifts said bellows, said upper piston, said connecting rod, and said lower piston, to thereby draw solvent into said connecting tube and up to and out of said pump head and to said self-cleaning injection nozzle.

9. A pump assembly according to claim 8 wherein said pump head is positioned underneath said bellows.

10. A pump assembly according to claim 8 wherein said upper piston is carried by upper portions of said bellows.

11. A pump assembly according to claim 8 wherein said connecting rod is positioned within said connecting tube.

12. A pump assembly according to claim 8 further comprising a check valve positioned at the lower end of said connecting tube for preventing unwanted air or other fluids from exiting said connecting tube while permitting solvent from the solvent container to enter.

13. A pump assembly according to claim 8 wherein said means for placing said outlet connector in communication with an injection nozzle comprises tubing.

14. A pump assembly according to claim 8 in which a portion of tubing connects said air compressor and said pump head so that air flows from said compressor to said pump head and into said bellows.

15. A pump assembly according to claim 8 wherein said inlet connector in said pump head is positioned vertically above said outlet connector in said pump head so that solvent which enters said pump head will be encouraged to flow from said pump head out of said outlet connector rather than out of said inlet connector.

16. A self-cleaning injection system for injecting foamable compositions into packaging applications, the system comprising:

an injection nozzle having an opening in one end thereof from which mixed foam precursors which form foamable compositions may exit, said one end comprising a tip assembly adjacent the outer exit portions of said injection nozzle and which is porous to gases and to certain liquids, but which is impermeable to other materials such as the foamable compositions which may otherwise exit said injection nozzle only through said opening; and a pump assembly for pumping cleaning solvent from a solvent container to said injection nozzle while maintaining a constant delivery of air or a mixture of air and solvent said injection nozzle, said pump assembly comprising, a solvent container, and an air compressor for sending air to said solvent container and for sending a mixture of solvent and air from said solvent container to said injection nozzle; and means for placing said pump assembly in communication with said injection nozzle whereby a mixture of air and solvent may be sent from said solvent container to said pump assembly, to said injection nozzle and out of said porous tip assembly, thereby helping to clean accumulated foamable composition from said outer exit portions of said injection nozzle.

17. A method of cleaning foamable compositions from the injection nozzle of an injection system for foamable compositions, the method comprising directing a solvent in which foamable compositions are soluble to the interior of a porous tip assembly which is adjacent the outer exit portions of an injection nozzle from which foamable compositions exit the injection nozzle, and which tip assembly is porous to gases and to certain liquids, but impermeable to other materials such as the foamable compositions which otherwise exit the nozzle, and forcing the solvent through and then out of the porous tip assembly adjacent the outer exit portions of the injection nozzle to thereby clean foamable compositions from the outer exit portions of the injection nozzle.

* * * * *

UNITED STATES PATENT AND TRADEMARK OFFICE
CERTIFICATE OF CORRECTION

PATENT NO. : 4,898,327

DATED : February 6, 1990

INVENTOR(S) : Sperry et al.

It is certified that error appears in the above-identified patent and that said Letters Patent is hereby corrected as shown below:

Column 1, Line 42, please delete "5".

Column 1, Line 66, please delete "07/236,013" and insert-- 07/235,013--.

Column 3, Line 15, please delete "10".

Column 6, Line 40, please delete "then" and insert--them--.

Column 6, Line 40, please delete "an" and insert--a--.

Signed and Sealed this

Fourth Day of June, 1991

Attest:

HARRY F. MANBECK, JR.

Attesting Officer

Commissioner of Patents and Trademarks